(12) United States Patent
Lee et al.

(10) Patent No.: US 9,869,221 B2
(45) Date of Patent: Jan. 16, 2018

(54) CATALYTIC CONVERTER FOR VEHICLE

(71) Applicant: HYUNDAI MOTOR COMPANY, Seoul (KR)

(72) Inventors: Jin Ha Lee, Seoul (KR); Ki Hyung Joo, Yongin-si (KR); Won Soon Park, Seongnam-si (KR); Young Su Kim, Suwon-si (KR); Jin Woo Park, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 11 days.

(21) Appl. No.: 14/940,978

(22) Filed: Nov. 13, 2015

(65) Prior Publication Data

US 2017/0081999 A1 Mar. 23, 2017

(30) Foreign Application Priority Data

Sep. 18, 2015 (KR) ........................ 10-2015-0132435

(51) Int. Cl.
| | |
|---|---|
| *F01N 3/00* | (2006.01) |
| *F01N 3/035* | (2006.01) |
| *F01N 3/08* | (2006.01) |
| *F01N 3/20* | (2006.01) |
| *F01N 3/28* | (2006.01) |

(Continued)

(52) U.S. Cl.
CPC ........... *F01N 3/035* (2013.01); *F01N 3/0814* (2013.01); *F01N 3/208* (2013.01); *F01N 3/2892* (2013.01); *F01N 11/002* (2013.01); *F01N 11/007* (2013.01); *F01N 13/008* (2013.01)

(58) Field of Classification Search
USPC .................. 60/286, 287, 295, 297, 301, 303
See application file for complete search history.

(56) References Cited

U.S. PATENT DOCUMENTS

| | | | |
|---|---|---|---|
| 7,062,904 B1 * | 6/2006 | Hu .......................... | F01N 3/035 60/274 |
| 7,313,911 B2 * | 1/2008 | Pfeifer ............... | B01D 53/9431 60/274 |

(Continued)

FOREIGN PATENT DOCUMENTS

| | | |
|---|---|---|
| KR | 10-2003-0094191 A | 12/2003 |
| KR | 10-1498181 B1 | 3/2015 |
| KR | 10-1498182 B1 | 3/2015 |

*Primary Examiner* — Binh Q Tran
(74) *Attorney, Agent, or Firm* — McDermott Will & Emery LLP (57) ABSTRACT

A catalytic converter for a vehicle includes an LNT converter into one side of which exhaust gas discharged from an engine flows and from the opposite side of which the exhaust gas. The LNT converter traps nitrogen oxide contained in the exhaust gas under a lean environment, desorbs the trapped nitrogen oxide under a rich environment, and reduces the nitrogen oxide contained in the exhaust gas or the desorbed nitrogen oxide. A connecting housing changes a direction of a path of the exhaust gas to a vertical direction, and allows a reducing agent to be injected to the exhaust gas. An SDPF converter changes a direction of a path of the exhaust gas to a direction opposite to a direction, captures particulate matters contained in the exhaust gas, and reduces nitrogen oxide contained in the exhaust gas using the injected reducing agent.

14 Claims, 13 Drawing Sheets

(51) Int. Cl.
 *F01N 11/00* (2006.01)
 *F01N 13/00* (2010.01)

(56) References Cited

U.S. PATENT DOCUMENTS

| | | | | |
|---|---|---|---|---|
| 7,730,719 B2* | 6/2010 | Yoshida | B01D 53/94 | 60/286 |
| 8,225,600 B2* | 7/2012 | Theis | F01N 3/0807 | 60/274 |
| 8,695,330 B2* | 4/2014 | Davidson | F01N 3/2066 | 60/286 |
| 8,820,059 B1* | 9/2014 | Fahrenkrug | F01N 3/2066 | 60/295 |
| 2008/0115485 A1* | 5/2008 | Lee | F01N 3/035 | 60/276 |
| 2011/0283687 A1* | 11/2011 | Dobler | F01N 13/1805 | 60/299 |
| 2013/0032274 A1* | 2/2013 | Latham | B29C 63/06 | 156/160 |
| 2013/0186064 A1* | 7/2013 | Mehta | F01N 3/0871 | 60/274 |
| 2014/0090374 A1* | 4/2014 | Chavannavar | F01N 3/0814 | 60/605.2 |
| 2014/0109557 A1* | 4/2014 | Calvo | F01N 3/106 | 60/301 |
| 2014/0165540 A1* | 6/2014 | Fischer | F01N 3/10 | 60/299 |

* cited by examiner

CATALYTIC CONVERTER FOR VEHICLE

CROSS-REFERENCE TO RELATED APPLICATION

This application claims the benefit of priority to Korean Patent Application No. 10-2015-0132435 filed in the Korean Intellectual Property Office on Sep. 18, 2015, the entire content of which is incorporated herein by reference.

TECHNICAL FIELD

The present disclosure relates to a catalytic converter for a vehicle, and more particularly, to a catalytic converter for a vehicle, capable of minimizing a distance between a lean NOx trap (LNT) converter and a diesel particle filter with selective catalytic reduction coating (SDPF) converter.

BACKGROUND

In general, exhaust gas is discharged from an engine through an exhaust manifold. Before the exhaust gas is discharged into atmosphere through a tail pipe, it is purified through a catalytic converter installed in an exhaust pipe and then passes through a muffler to attenuate noise. The catalytic converter removes pollutants contained in the exhaust gas. Further, a particulate filter is mounted in the exhaust pipe to capture particulate matters (PM) contained in the exhaust gas.

A denitrification catalyst (DeNOx Catalyst) is a type of catalytic converter that removes nitrogen oxide (NOx) contained in the exhaust gas. When a reducing agent, such as urea, ammonia, carbon monoxide, and hydrocarbon (HC), is in the exhaust gas, the nitrogen oxide contained in the exhaust gas is reduced in the denitrification catalyst through an oxidation-reduction reaction with the reducing agent.

Recently, a lean NOx trap (LNT) is used as the denitrification catalyst. When the LNT operates under a lean environment in which an air/fuel ratio for the engine is low, the LNT adsorbs the nitrogen oxide contained in the exhaust gas. When the LNT operates under a rich environment in which the air/fuel ratio for the engine is high, the LNT desorbs the adsorbed nitrogen oxide and reduces the desorbed nitrogen oxide and the nitrogen oxide contained in the exhaust gas.

However, the LNT cannot remove the nitrogen oxide contained in the exhaust gas when a temperature of the exhaust gas is high (e.g., a temperature of the exhaust gas is higher than 400° C.). In particular, when the particulate filter for capturing particulate matters (PM) contained in the exhaust gas is regenerated or sulfur deactivated by the LNT is removed, the temperature of the exhaust gas becomes very high. Therefore, the nitrogen oxide contained in the exhaust gas may be discharged to the outside of the vehicle.

Recently, as the emission regulations become stricter, a separate DeNOx catalyst (e.g., composite catalyst unit (diesel particle filter with selective catalytic reduction coating (SDPF)) is used together with the LNT.

In the related art, the SDPF is installed at a rear end of the LNT, and as a result, a predetermined distance between the LNT and the SDPF needs to be maintained in order to uniformly input urea to the SCR.

For this reason, a thermal loss occurs and a NOx removal rate of the SCR deteriorates while the exhaust gas discharged from the LNT reaches the SDPF. A method of increasing a temperature of the exhaust gas by using post-injection is sometimes used to solve the above problem, but in this case, fuel efficiency of the vehicle decreases.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a catalytic converter for a vehicle, which has a new structure capable of minimizing a distance between an LNT and an SDPF in order to maximize efficiency of an SDPF for removing NOx.

According to an exemplary embodiment of the present inventive concept, a catalytic converter for a vehicle includes a lean NOx trap (LNT) converter into one side which exhaust gas discharged from an engine flows and through the opposite side of which the exhaust gas exits, trapping nitrogen oxide contained in the exhaust gas under a lean environment in which an air/fuel ratio is lower than a reference ratio, desorbs the trapped nitrogen oxide under a rich environment in which the air/fuel ratio is the same or higher than the reference ratio, and reducing the nitrogen oxide contained in the exhaust gas or the desorbed nitrogen oxide. A connecting housing changes a direction of a path of the exhaust gas discharged from the LNT converter to a vertical direction, and allows a reducing agent to be injected to the exhaust gas. A diesel particle filter with selective catalytic reduction coating (SDPF) converter changes a direction of a path of the exhaust gas flowing from the connecting housing to a direction opposite to a direction in which the exhaust gas is discharged from the LNT converter, captures particulate matters contained in the exhaust gas, and reduces nitrogen oxide contained in the exhaust gas using the injected reducing agent.

The LNT converter may include: an LNT body in which an LNT catalyst is disposed; an LNT inlet which is formed in the LNT body and into which the exhaust gas discharged from the engine flows; and an LNT outlet which is formed in the LNT body at an opposite side to the LNT inlet and from which the exhaust gas passing through the LNT catalyst is discharged.

The catalytic converter may further include an LNT thermal insulator which is disposed between the LNT body and the LNT catalyst.

The LNT inlet may be formed in an LNT conical portion having a cross section that gradually increases along a movement path of the exhaust gas.

The LNT conical portion may have a front end temperature sensor bracket on which a front end temperature sensor is installed, and a front end lambda sensor bracket on which a front end lambda sensor is installed.

The SDPF converter may include: an SDPF body in which an SDPF catalyst is disposed; an SDPF inlet which is formed at one side of the SDPF body and into which the exhaust gas discharged from the connecting housing flows; and an SDPF outlet which is formed at the other side of the SDPF body opposite to the SDPF inlet and from which the exhaust gas passing through the SDPF catalyst is discharged.

The catalytic converter may further include an SDPF thermal insulator which is disposed between the SDPF body and the SDPF catalyst.

A rear end nitrogen oxide sensor bracket on which a rear end nitrogen oxide sensor is installed, and a rear end pressure sensor bracket on which a differential pressure sensor is installed, may be formed at a side of the SDPF outlet.

The connecting housing may include: a lower cover which connects a portion of the LNT outlet and a portion of the SDPF inlet; and an upper cover which is disposed at an upper side of the lower cover and covers the LNT outlet and the SDPF inlet, and a connecting flow path along which the exhaust gas moves from the LNT outlet to the SDPF inlet may be formed between the lower cover and the upper cover.

The upper cover may include: an inner cover; an outer cover which is disposed at the outside of the inner cover and formed in a shape corresponding to the inner cover; and a connecting thermal insulator which is disposed between the inner cover and the outer cover.

An injection module bracket, on which an injection module for injecting a reducing agent to the exhaust gas is installed, may be formed on the upper cover, and the injection module may inject the reducing agent in a direction of the connecting flow path formed in the connecting housing.

A mixer, which uniformly mixes the reducing agent injected from the injection module with the exhaust gas, may be disposed between the upper cover and the lower cover.

The upper cover may have a sensor bracket on which a front end nitrogen oxide sensor and a rear end lambda sensor are installed, a rear end temperature sensor bracket on which a rear end temperature sensor is installed, and a front end pressure sensor bracket on which a differential pressure sensor is installed.

The catalytic converter may further include at least one LNT bracket for fixing the LNT converter to the engine.

The catalytic converter may further include at least one connecting bracket for fixing the connecting housing to the engine.

The catalytic converter may further include at least one SDPF bracket for fixing the SDPF converter to the engine.

According to the catalytic converter for a vehicle according to the exemplary embodiment of the present invention, since the LNT converter and the SDPF converter are connected through the connecting housing, it is possible to minimize a path along which the exhaust gas, which is discharged from the engine and then passes through the LNT converter, flows into the SDPF converter.

Since a path along which the exhaust gas is discharged from the LNT converter and then flows into the SDPF converter is minimized, it is possible to minimize a decrease in temperature of the exhaust gas, thereby improving a NOx removal rate of the SCR.

BRIEF DESCRIPTION OF THE DRAWINGS

The drawings are intended to be used as references for describing exemplary embodiments, and the accompanying drawings should not be construed as limiting the technical spirit of the present disclosure.

DETAILED DESCRIPTION OF THE EMBODIMENTS

The present disclosure will be described more fully hereinafter with reference to the accompanying drawings, in which exemplary embodiments of the invention are shown. As those skilled in the art would realize, the described embodiments may be modified in various different ways, all without departing from the spirit or scope of the present disclosure.

A part irrelevant to the description will be omitted to clearly describe the present disclosure, and the same or similar constituent elements will be designated by the same reference numerals throughout the specification.

The size and thickness of each component illustrated in the drawings are arbitrarily shown for understanding and ease of description, but the present disclosure is not limited thereto. Thicknesses of several portions and regions are enlarged for clear expressions.

Hereinafter, a catalytic converter for a vehicle according to an exemplary embodiment of the present inventive concept will be described in detail with reference to the accompanying drawings.

Figure 1:
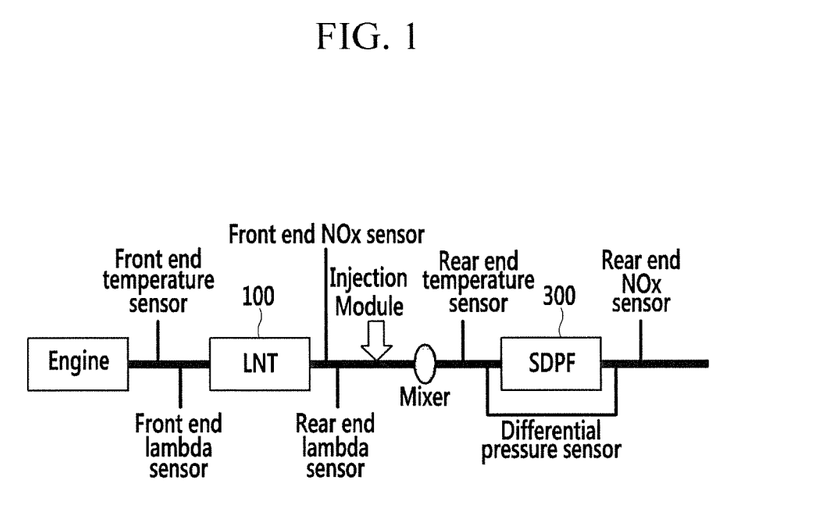
FIG. 1 is a block diagram illustrating a configuration of a catalytic converter for a vehicle according to an exemplary embodiment of the present inventive concept.
Figure 2:
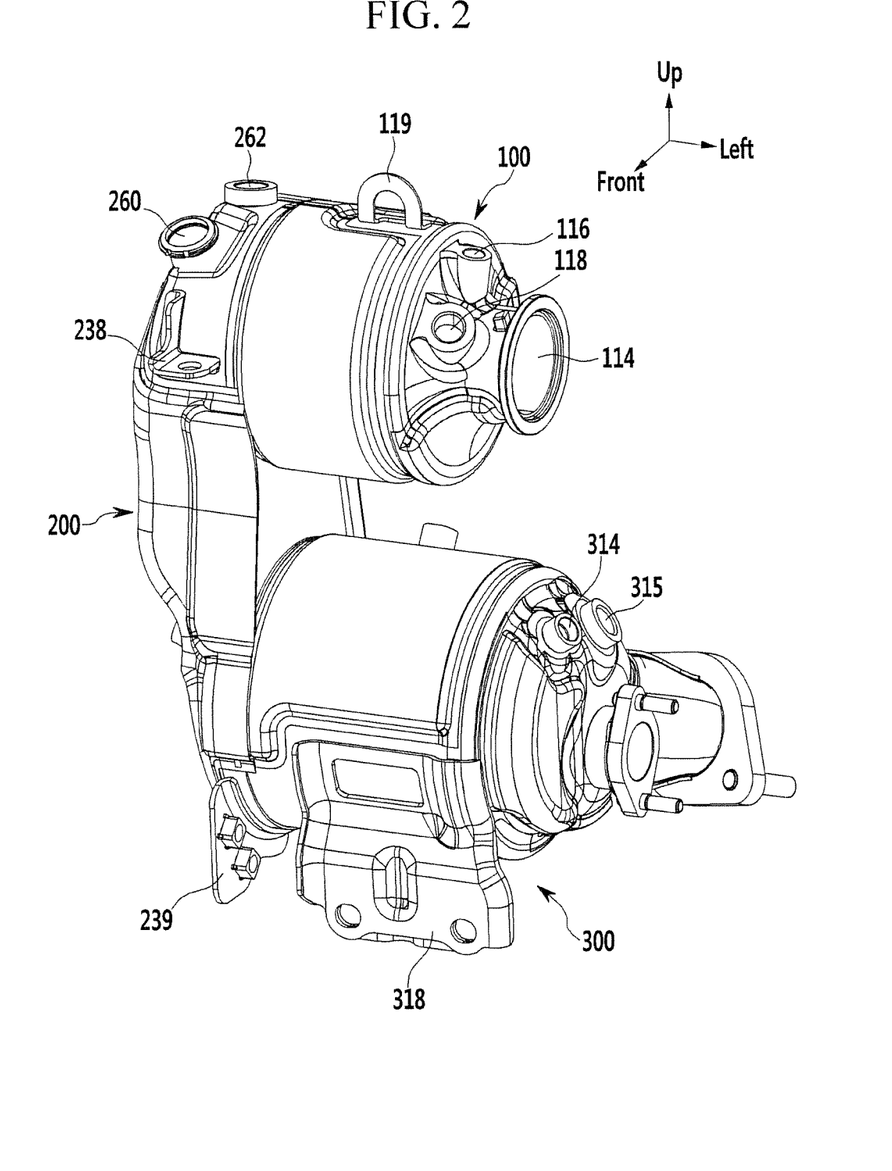
FIG. 2 is a perspective view illustrating the catalytic converter according to the exemplary embodiment of the present inventive concept.
Figure 3:
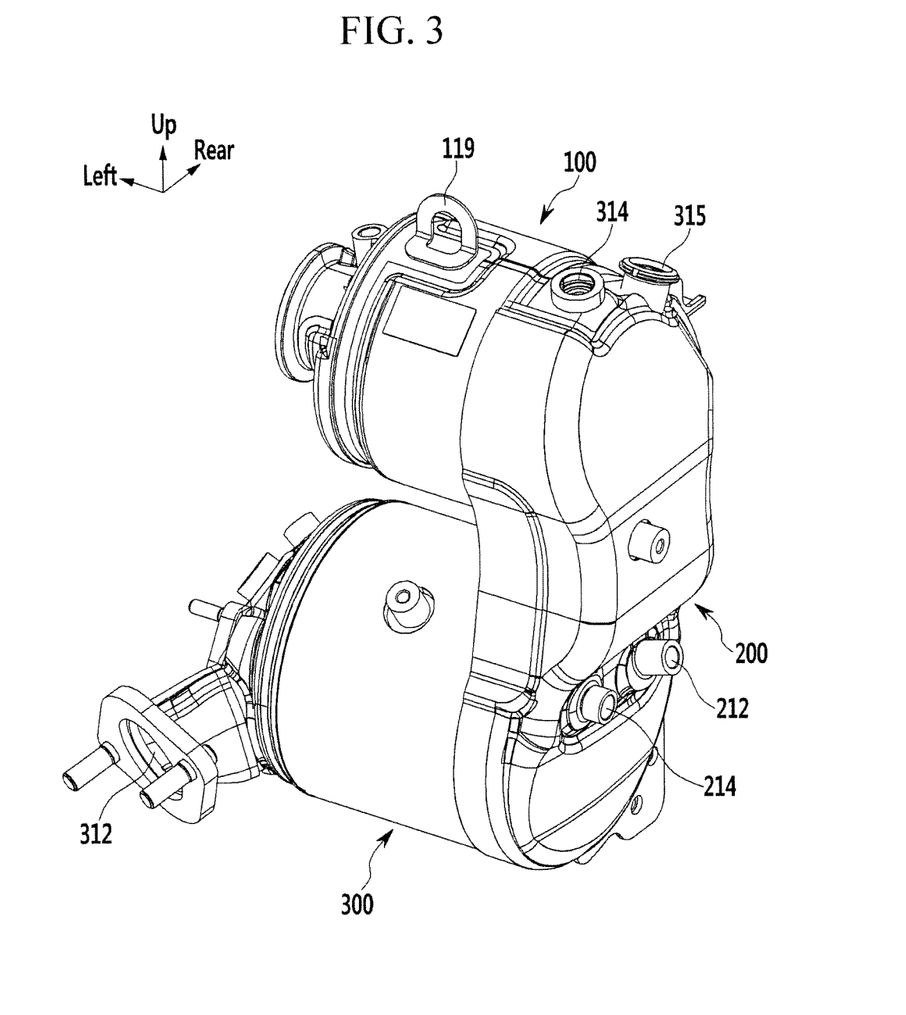
FIG. 3 is another perspective view illustrating the catalytic converter according to the exemplary embodiment of the present inventive concept.
Figure 4:
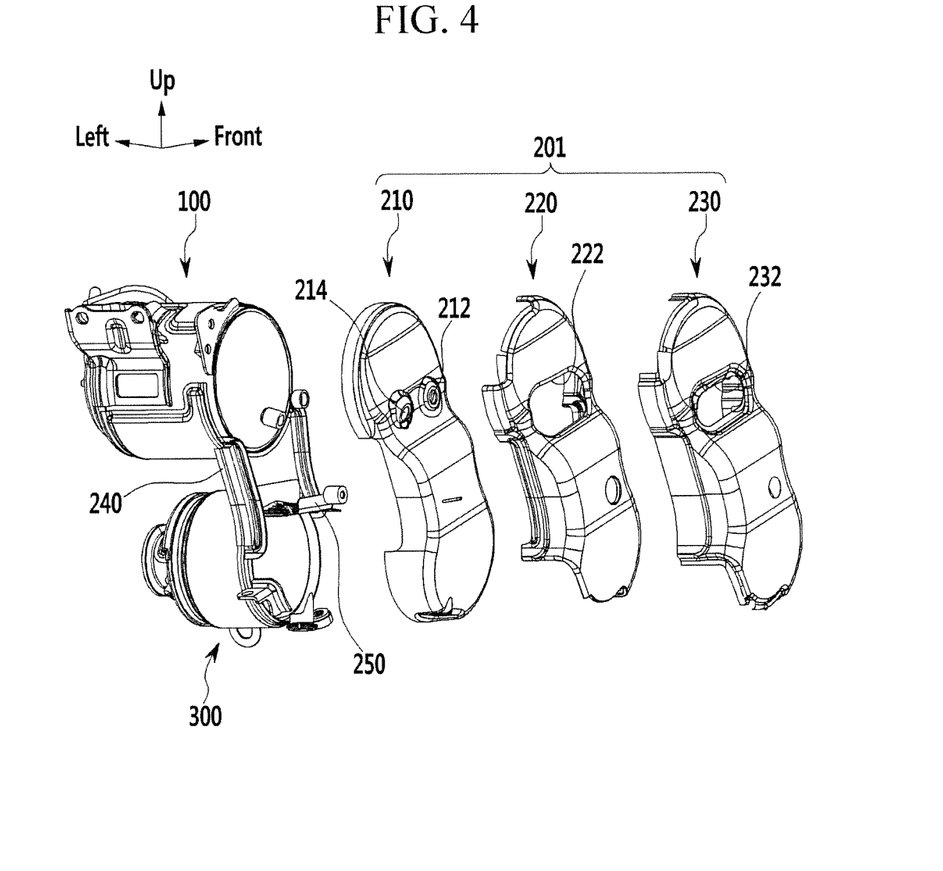
FIG. 4 is an exploded perspective view illustrating the catalytic converter according to the exemplary embodiment of the present inventive concept.

FIG. 1 is a block diagram illustrating a configuration of a catalytic converter for a vehicle according to an exemplary embodiment of the present inventive concept. FIG. 2 is a perspective view illustrating the catalytic converter for a vehicle according to the exemplary embodiment of the present inventive concept. FIG. 3 is another perspective view illustrating the catalytic converter for a vehicle according to the exemplary embodiment of the present inventive concept. FIG. 4 is an exploded perspective view illustrating the catalytic converter for a vehicle according to the exemplary embodiment of the present inventive concept.

As illustrated in FIGS. 1 to 4, a catalytic converter for a vehicle according to an exemplary embodiment of the present inventive concept includes a lean NOx trap (LNT) converter 100, a diesel particle filter with selective catalytic reduction coating (SDPF) converter 300, and a connecting housing 200 which connects the LNT converter 100 and the SDPF converter 300.

Exhaust gas, which flows into and exits from the LNT converter 100, flows from left to right based on the drawings.

The connecting housing 200 changes a path of the exhaust gas so that the exhaust gas discharged from the LNT converter 100 flows downward in a vertical direction. That is, the exhaust gas flows from an upper side to a lower side inside the connecting housing 200. In this case, a reducing agent is injected to the exhaust gas through an injection module (not shown).

Further, the exhaust gas, which flows into the SDPF converter 300 from the connecting housing 200, flows from right to left inside the LNT converter 100. That is, a direction in which the exhaust gas flows inside the LNT converter 100 is opposite to a direction in which the exhaust gas flows inside the SDPF converter 300.

Since the direction in which the exhaust gas flows inside the LNT converter 100 is opposite to that inside the SDPF converter 300, direct connection is made between the LNT converter 100 and the SDPF converter 300, and thus it is possible to minimize thermal loss of the exhaust gas.

Hereinafter, the LNT converter 100, the connecting housing 200, and the SDPF converter 300 according to the present disclosure will be specifically described.

First, the LNT converter will be described in detail with reference to the accompanying drawings.

Figure 5:
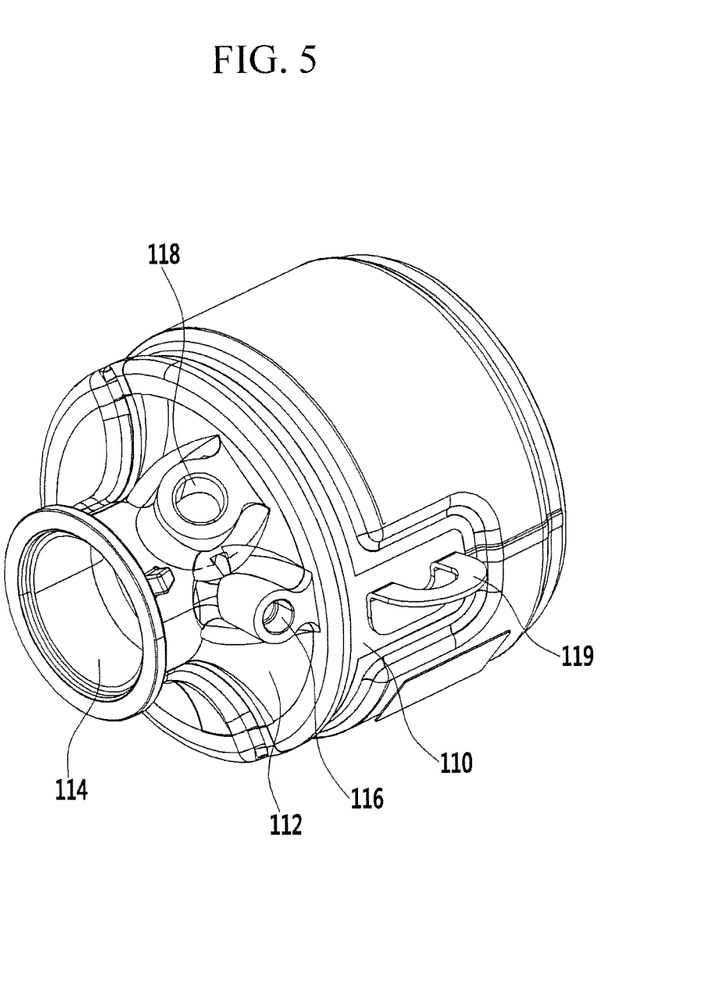
FIG. 5 is a perspective view illustrating an LNT converter according to an exemplary embodiment of the present inventive concept.
Figure 6:
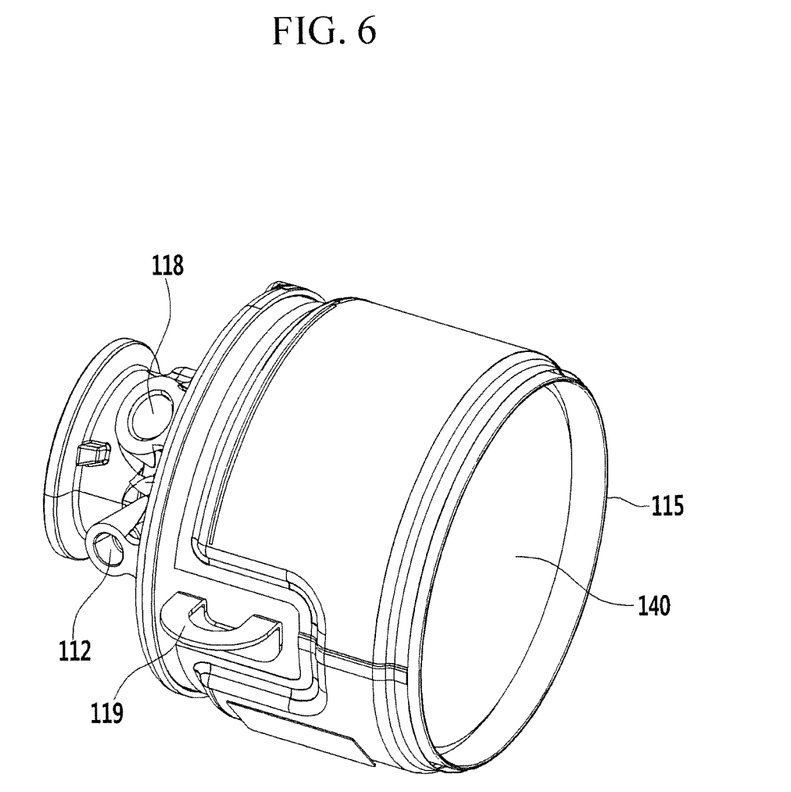
FIG. 6 is another perspective view illustrating the LNT converter according to the exemplary embodiment of the present inventive concept.
Figure 7:
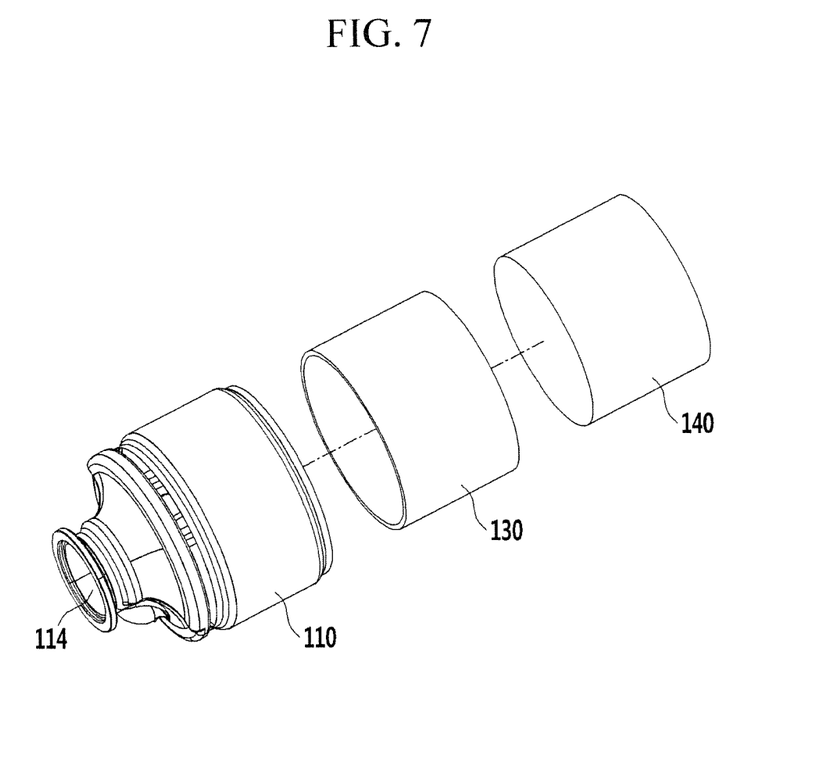
FIG. 7 is an exploded perspective view of the LNT converter according to the exemplary embodiment of the present inventive concept.

FIG. 5 is a perspective view illustrating the LNT converter according to the exemplary embodiment of the present inventive concept. FIG. 6 is another perspective view illustrating the LNT converter according to the exemplary embodiment of the present inventive concept. FIG. 7 is an exploded perspective view of the LNT converter according to the exemplary embodiment of the present inventive concept.

Referring to FIGS. 5 to 7, the LNT converter 100 has an LNT inlet 114 and an LNT outlet 115 so that the exhaust gas discharged from the engine flows into the LNT converter 100 and then exits through the opposite side.

The LNT converter 100 includes an LNT body 110 in which an LNT catalyst 140 is provided, the LNT inlet 114 which is formed in the LNT body 110 and into which the exhaust gas discharged from the engine flows. The LNT outlet 115 is formed in the LNT body 110 at an opposite side to the LNT inlet 114 and the exhaust gas passing through the LNT catalyst 140 is discharged from the LNT outlet 115.

The LNT inlet 114 and the LNT outlet 115 may be coaxial with each other. Since the LNT inlet 114 and the LNT outlet 115 are coaxial with each other, the exhaust gas flows into the LNT inlet 114, passes through the LNT catalyst 140, and then exits through the LNT outlet 115 in a horizontal direction (from the left to the right).

The LNT body 110 has a cylindrical shape. An LNT conical portion 112, which has a cross section that gradually increases along a movement path of the exhaust gas, is formed at one side of the LNT body 110, and the LNT inlet 114 is formed in the LNT conical portion 112.

Here, a length of the LNT converter 100 may be 0.5 to 1 time of that of the engine.

In addition, the LNT conical portion 112 has a front end temperature sensor bracket 118 on which a front end temperature sensor is installed, and a front end lambda sensor bracket 116 on which a front end lambda sensor is installed. The front end temperature sensor detects a temperature of the exhaust gas flowing into the LNT converter 100, and the front end lambda sensor detects concentration of oxygen contained in the exhaust gas flowing into the LNT converter 100.

The LNT catalyst 140 is provided in the LNT body 110. An LNT thermal insulator 130 may be provided between the LNT body 110 and the LNT catalyst 140. Since the LNT thermal insulator 130 is disposed between the LNT body 110 and the LNT catalyst 140, it is possible to prevent a thermal loss of the exhaust gas flowing into the LNT converter 100.

An LNT bracket 119 for fixing the LNT converter 100 to the engine is provided at an outer periphery of the LNT body 110.

Next, the SDPF converter will be described in detail with reference to the accompanying drawings.

Figure 10:
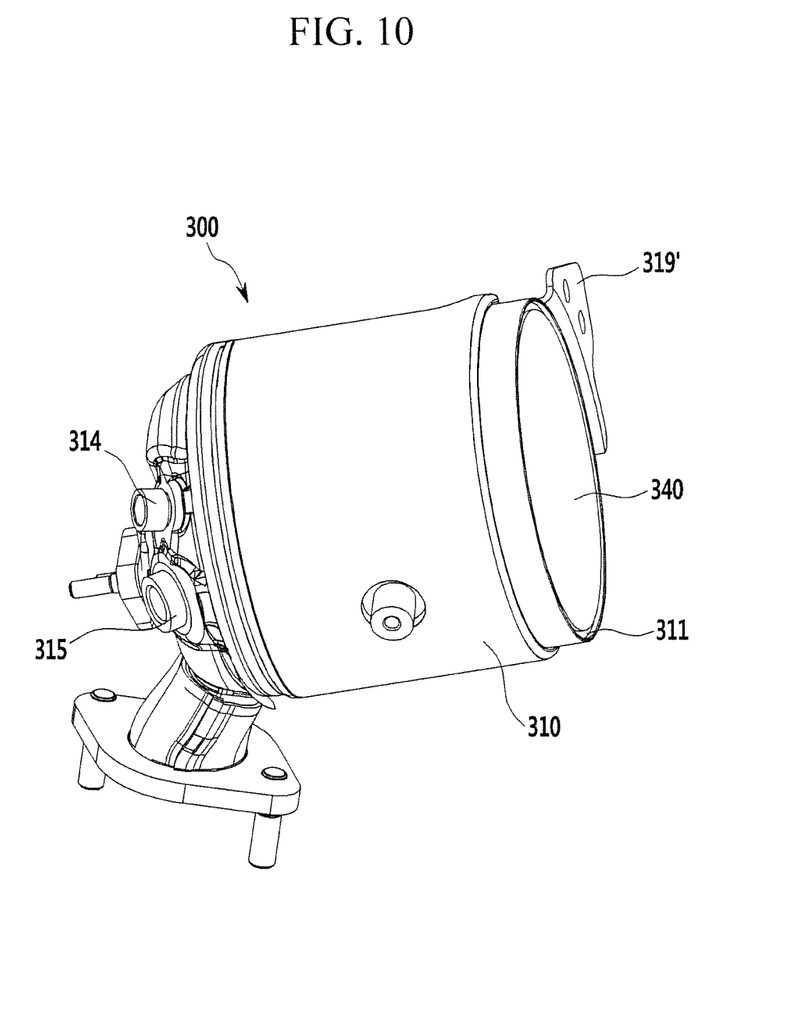
FIG. 10 is a perspective view illustrating an SDPF converter according to an exemplary embodiment of the present inventive concept.
Figure 11:
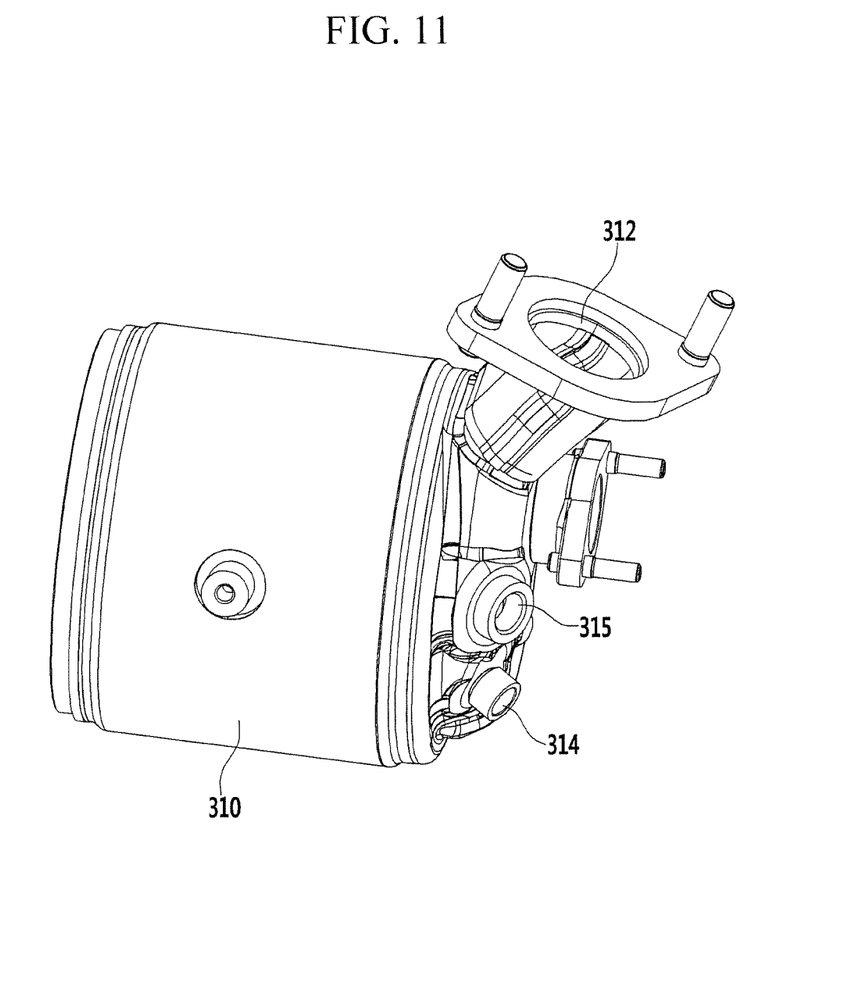
FIG. 11 is another perspective view illustrating the SDPF converter according to the exemplary embodiment of the present inventive concept.
Figure 12:
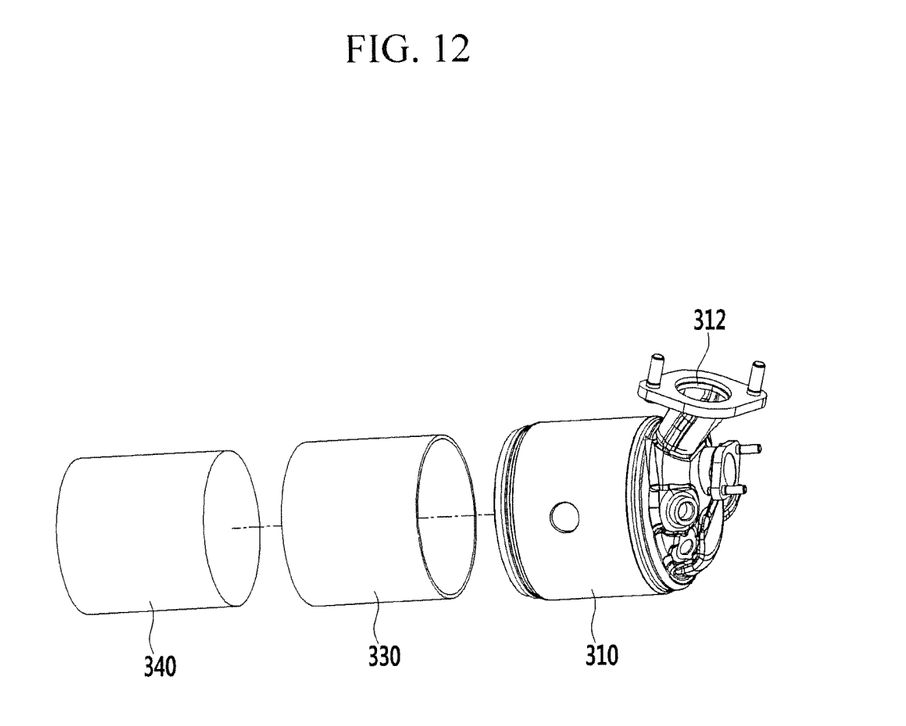
FIG. 12 is an exploded perspective view illustrating the SDPF converter according to the exemplary embodiment of the present inventive concept.

FIG. 10 is a perspective view illustrating the SDPF converter according to the exemplary embodiment of the present inventive concept. FIG. 11 is another perspective view illustrating the SDPF converter according to the exemplary embodiment of the present inventive concept. FIG. 12 is an exploded perspective view illustrating the SDPF converter according to the exemplary embodiment of the present inventive concept.

Referring to FIGS. 10 to 12, the SDPF converter 300 includes an SDPF body 310 in which an SDPF catalyst 340 is provided and an SDPF inlet 311 which is formed at one side of the SDPF body 310 and into which the exhaust gas discharged from the connecting housing 200 flows. An SDPF outlet 312 is formed at the other side of the SDPF body 310 at the opposite side to the SDPF inlet 311, and the exhaust gas passing through the SDPF catalyst 340 is discharged from the SDPF outlet 312.

In this case, a length of the SDPF converter 300 may be 1 to 2 times of that of the engine.

The exhaust gas discharged through the SDPF outlet 312 passes through a muffler (not illustrated) to attenuate noise, and is then discharged into the atmosphere through a tail pipe (not illustrated).

The SDPF catalyst 340 is provided in the SDPF body 310. The SDPF catalyst 340 is formed by coating a porous barrier wall, which constituents a channel of a DPF, with an SCR catalyst.

While the exhaust gas passes through the SDPF catalyst 340, particulate matters contained in the exhaust gas are captured. In addition, the SCR catalyst coated on the SDPF catalyst 340 reduces nitrogen oxide contained in the exhaust gas using the reducing agent injected by the injection module.

An SDPF thermal insulator 330 may be provided between the SDPF body 310 and the SDPF catalyst 340, and thus, it is possible to prevent a thermal loss of the exhaust gas flowing into the SDPF converter 300.

In addition, at a side of the SDPF outlet 312, a rear end nitrogen oxide sensor bracket 315 is formed on which a rear end nitrogen oxide sensor is installed, and a rear end pressure sensor bracket 314 is formed on which a differential pressure sensor is installed. The rear end nitrogen oxide sensor detects the amount of nitrogen oxide contained in the exhaust gas passing through the SDPF catalyst 340. The differential pressure sensor is installed between the rear end pressure sensor bracket 314 and the front end pressure sensor bracket 214. The differential pressure sensor detects a difference in pressure of the exhaust gas between before and after the exhaust gas passes through the SDPF catalyst 340.

At least one SDPF bracket 318 or 319 for fixing the SDPF converter 300 to the engine is provided on the SDPF body 310.

Next, the connecting housing 200 will be described in detail with reference to the accompanying drawings.

Figure 8:
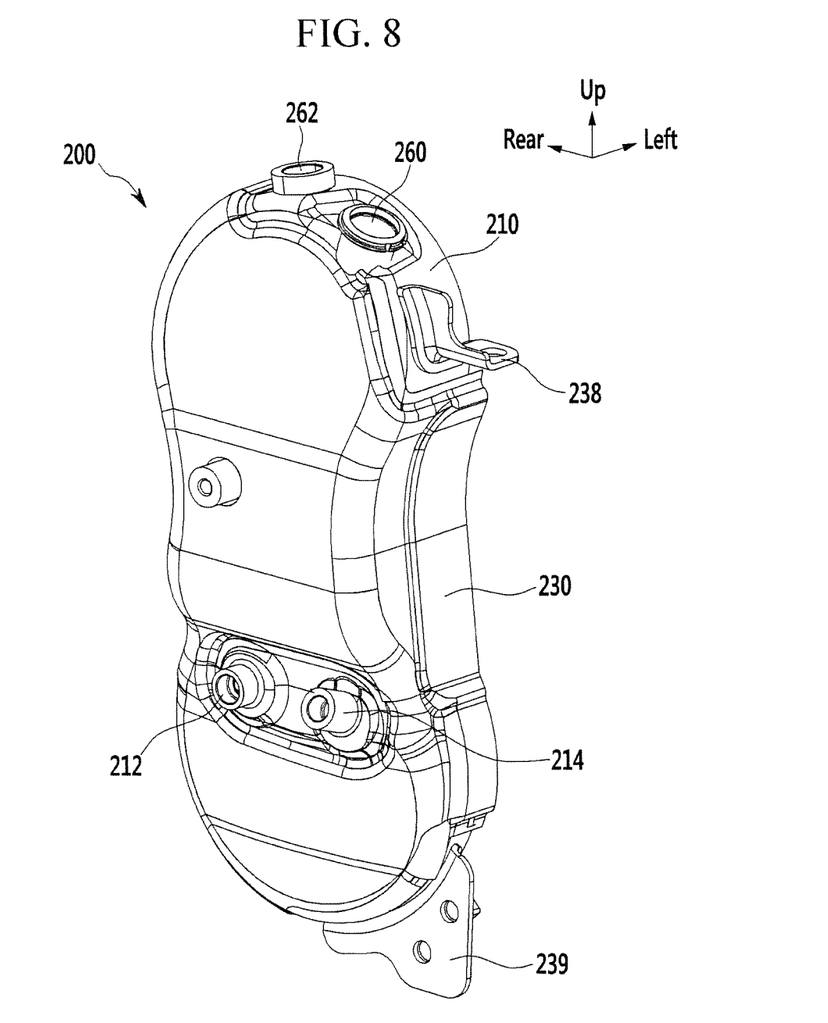
FIG. 8 is a perspective view illustrating a connecting housing according to an exemplary embodiment of the present inventive concept.
Figure 9:
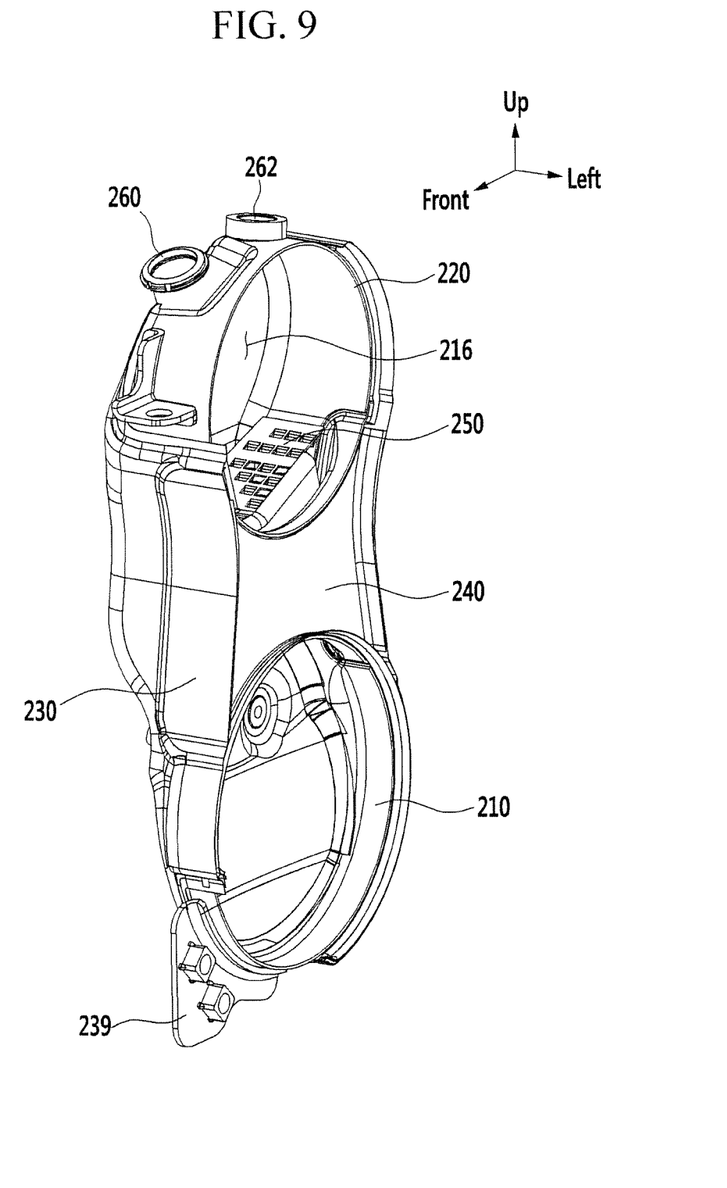
FIG. 9 is another perspective view illustrating the connecting housing according to the exemplary embodiment of the present inventive concept.

FIG. 8 is a perspective view illustrating a connecting housing according to the exemplary embodiment of the present inventive concept. FIG. 9 is another perspective view illustrating the connecting housing according to the exemplary embodiment of the present inventive concept.

Referring to FIGS. 4, 8, and 9, the connecting housing 200 includes a lower cover 240 which connects a portion of the LNT outlet 115 and a portion of the SDPF inlet 311. An upper cover 201 is provided at an upper side of the lower cover 240 and covers the LNT outlet 115 and the SDPF inlet 311.

A connecting flow path 216 along which the exhaust gas moves from the LNT outlet 115 to the SDPF inlet 311 is formed between the lower cover 240 and the upper cover 201. In this case, the exhaust gas, which flows in the horizontal direction inside the LNT converter 100 through the connecting flow path 216, flows vertically downward (from an upper side to a lower side).

The upper cover 201 includes an inner cover 210, an outer cover 230 which is provided at the outside of the inner cover 210 and has a shape corresponding to the inner cover 210. A connecting thermal insulator 220 is provided between the inner cover 210 and the outer cover 230. Since the connecting thermal insulator 220 is provided between the inner cover 210 and the outer cover 230, it is possible to prevent a thermal loss of the exhaust gas passing through the connecting flow path 216 formed between the inner cover 210 and the lower cover 240.

The injection module, which injects the reducing agent to the exhaust gas, is provided on the upper cover 201. The injection module injects the reducing agent in a direction (the vertical direction) of the connecting flow path 216 formed in the connecting housing 200.

In this case, a mixer 250, which uniformly mixes the reducing agent injected from the injection module with the exhaust gas, is installed between the upper cover 201 and the lower cover 240. The mixer 250 has a plate-shaped mixer body with a plurality of mixing holes, such that the exhaust gas may be uniformly mixed with the reducing agent while passing through the mixing holes.

On the upper cover 201, a sensor bracket 262 is formed on which a front end nitrogen oxide sensor and a rear end lambda sensor are installed. An injection module bracket 260 is formed on which the injection module for injecting the reducing agent is installed. A rear end temperature sensor bracket 212 is formed on which a rear end temperature sensor is installed, and a front end pressure sensor bracket 214 is formed on which a pressure sensor is installed.

The front end nitrogen oxide sensor detects the amount of nitrogen oxide contained in the exhaust gas passing through the LNT catalyst 140. The rear end lambda sensor detects concentration of oxygen contained in the exhaust gas passing through the LNT catalyst 140. The rear end temperature sensor detects a temperature of the exhaust gas flowing into the SDPF catalyst 340.

At least one connecting bracket 238 or 239 for fixing the connecting housing 200 to the engine is provided on the upper cover 201.

Hereinafter, a flow of the exhaust gas flowing in the catalytic converter for a vehicle according to the exemplary embodiment of the present inventive concept will be described in detail with reference to the accompanying drawings.

Figure 13:
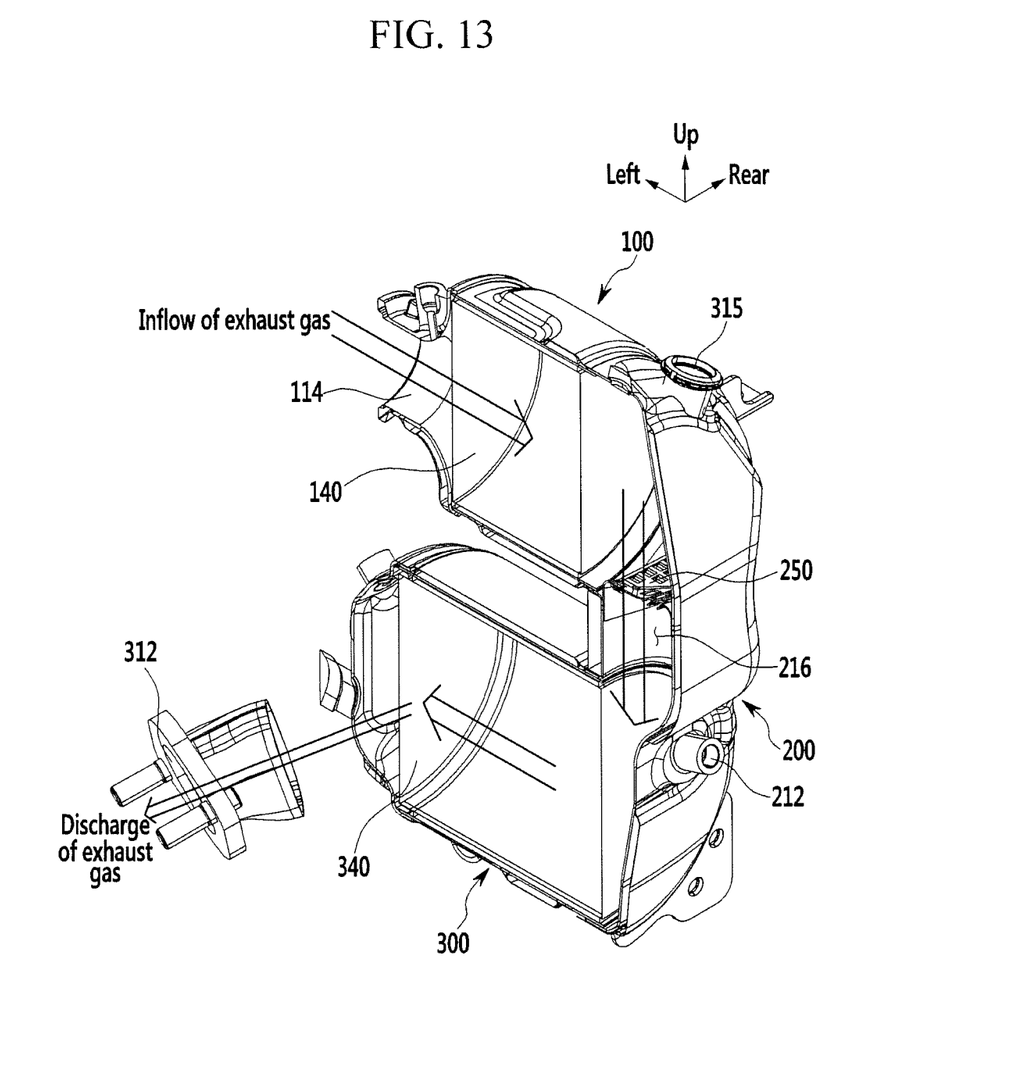
FIG. 13 is a schematic view for explaining a flow of exhaust gas in the catalytic converter for a vehicle according to the exemplary embodiment of the present inventive concept.

FIG. 13 is a schematic view for explaining a flow of exhaust gas in the catalytic converter for a vehicle according to the exemplary embodiment of the present inventive concept.

Referring to FIG. 13, the exhaust gas, which is discharged from the engine, flows into the LNT inlet 114, passes through the LNT catalyst 140, and then exits through the LNT outlet 115. In this case, since the LNT outlet 115 is formed to be opposite to the LNT inlet 114, the exhaust gas flows from left to right.

While the exhaust gas passes through the LNT catalyst 140, the LNT catalyst 140 traps nitrogen oxide (NOx) contained in the exhaust gas under a lean environment in which an air/fuel ratio is low, desorbs the trapped nitrogen oxide under a rich environment, and reduces the nitrogen oxide contained in the exhaust gas or the desorbed nitrogen oxide. In addition, the LNT catalyst 140 oxidizes carbon monoxide (CO) and hydrocarbon (HC) contained in the exhaust gas.

It should be understood that the hydrocarbon refers to a compound consisting of carbon and hydrogen contained in exhaust gas and fuel.

The exhaust gas passing through the LNT converter 100 flows from the upper side to the lower side inside the connecting housing 200. In this case, the reducing agent (e.g., urea) is injected to the exhaust gas by the injection module provided on the upper cover 201. Further, the reducing agent and the exhaust gas are uniformly mixed by the mixer.

The exhaust gas mixed with the reducing agent flows into the SDPF converter 300, and the exhaust gas flows from right to left inside the SDPF converter 300. While the exhaust gas passes through the SDPF catalyst 340 in the SDPF converter 300, particulate matters contained in the exhaust gas are captured, and nitrogen oxide contained in the exhaust gas is reduced by the SCR catalyst.

According to the exemplary embodiment of the present inventive concept, the direction in which the exhaust gas flows in the LNT converter 100 is opposite to the direction in which the exhaust gas flows in the SDPF converter 300, and the connecting housing 200 is provided so that the exhaust gas discharged from the LNT converter 100 flows vertically downward. Further, the injection module is disposed to inject the reducing agent in a direction in which the exhaust gas flows in the connecting housing 200.

As described above, since the direction in which the exhaust gas flows in the LNT converter 100 is opposite to the direction in which the exhaust gas flows in the SDPF converter 300 and the connecting housing 200 allows the exhaust gas discharged from the LNT converter 100 to flow vertically downward (in the vertical direction) into the SDPF inlet of the SDPF converter, the LNT converter 100 and the SDPF converter 300 may be disposed to be closest to each other. In addition, since the reducing agent is injected by the injection module in a direction in which the exhaust gas flows in the connecting housing 200 that connects the LNT converter 100 and the SDPF converter 300, it is possible to minimize a distance between the LNT converter 100 and the SDPF converter 300.

According to the present disclosure, it is possible to minimize a thermal loss of the exhaust gas that is discharged from the LNT converter 100 and then flows into the SDPF converter 300.

In addition, since the thermal insulators are provided in the LNT converter 100, the connecting housing 200, and the SDPF converter 300, it is possible to minimize a thermal loss of the exhaust gas.

Since a thermal loss of the exhaust gas, which passes through the LNT converter 100 and then flows into the SDPF converter 300, is minimized, it is possible to maintain a high temperature of the exhaust gas flowing into the SDPF converter 300, and thus to improve a purification rate of the SCR catalyst.

Since the catalytic converter can be stably fixed to an engine housing (not illustrated) or an exhaust manifold (not illustrated) by means of the LNT bracket 119, the connecting brackets 238 and 239, and the SDPF bracket 319, it is possible to enhance overall rigidity of the catalytic converter.

While this invention has been described in connection with what is presently considered to be practical exemplary embodiments, it is to be understood that the invention is not limited to the disclosed embodiments, but on the contrary, is intended to cover various modifications and equivalent arrangements included within the spirit and scope of the appended claims.

What is claimed is:

1. A catalytic converter for a vehicle, the catalytic converter comprising:
    an LNT converter trapping nitrogen oxide contained in exhaust gas under a lean environment in which an air/fuel ratio is lower than a reference ratio, desorbing the trapped nitrogen oxide under a rich environment in which the air/fuel ratio for an engine is the same or higher than the reference ratio, and reducing the nitrogen oxide contained in the exhaust gas or the desorbed nitrogen oxide;
    a connecting housing changing a path of the exhaust gas discharged from the LNT converter to a vertical direction and allowing a reducing agent to be injected to the exhaust gas; and
    a diesel particle filter with selective catalytic reduction coating (SDPF) converter changing a direction of a path of the exhaust gas flowing from the connecting housing to a direction opposite to a direction in which the exhaust gas is discharged from the LNT converter, capturing particulate matters contained in the exhaust gas, and reducing the nitrogen oxide contained in the exhaust gas using the reducing agent,
    wherein the connecting housing includes:
        a lower cover connecting a portion of the LNT outlet and a portion of the SDPF inlet;
        an upper cover disposed at an upper side of the lower cover and covering the LNT outlet and the SDPF inlet; and
        a connecting flow path formed between the lower cover and the upper cover and along which the exhaust gas moves from the LNT outlet to the SDPF inlet,
    wherein the upper cover includes:
        an inner cover;
        an outer cover attached to an outer side of the inner cover and having a shape corresponding to the inner cover; and
        a connecting thermal insulator disposed between the inner cover and the outer cover.

2. The catalytic converter of claim 1, wherein the LNT converter includes:
    an LNT body in which an LNT catalyst is disposed;
    an LNT inlet formed in the LNT body and into which the exhaust gas discharged from the engine flows; and
    an LNT outlet formed in the LNT body at an opposite side to the LNT inlet and from which the exhaust gas passing through the LNT catalyst is discharged.

3. The catalytic converter of claim 2, further comprising:
    an LNT thermal insulator disposed between the LNT body and the LNT catalyst.

4. The catalytic converter of claim 2, wherein the LNT inlet is formed in an LNT conical portion which has a cross section gradually increasing along a movement path of the exhaust gas.

5. The catalytic converter of claim 4, wherein the LNT conical portion has a front end temperature sensor bracket on which a front end temperature sensor is installed and a front end lambda sensor bracket on which a front end lambda sensor is installed.

6. The catalytic converter of claim 1, wherein the SDPF converter includes:
    an SDPF body in which an SDPF catalyst is disposed;
    an SDPF inlet formed at one side of the SDPF body and into which the exhaust gas discharged from the connecting housing flows; and
    an SDPF outlet formed at the other side of the SDPF body opposite to the SDPF inlet and from which the exhaust gas passing through the SDPF catalyst is discharged.

7. The catalytic converter of claim 6, further comprising:
    an SDPF thermal insulator disposed between the SDPF body and the SDPF catalyst.

8. The catalytic converter of claim 1, wherein the SDPF outlet has a rear end nitrogen oxide sensor bracket on which a rear end nitrogen oxide sensor is installed and a rear end pressure sensor bracket on which a differential pressure sensor is installed.

9. The catalytic converter of claim 1, wherein an injection module bracket, on which an injection module for injecting a reducing agent to the exhaust gas is installed, is formed on the upper cover, and
    wherein the injection module injects the reducing agent in a direction of the connecting flow path formed in the connecting housing.

10. The catalytic converter of claim 9, wherein a mixer, which uniformly mixes the reducing agent injected from the injection module with the exhaust gas, is disposed between the upper cover and the lower cover.

11. The catalytic converter of claim 1, wherein the upper cover has a sensor bracket on which a front end nitrogen oxide sensor and a rear end lambda sensor are installed, a rear end temperature sensor bracket on which a rear end temperature sensor is installed, and a front end pressure sensor bracket on which a differential pressure sensor is installed.

12. The catalytic converter of claim 1, further comprising:
    at least one LNT bracket for fixing the LNT converter to the engine.

13. The catalytic converter of claim 1, further comprising:
    at least one connecting bracket for fixing the connecting housing to the engine.

14. The catalytic converter of claim 1, further comprising:
    at least one SDPF bracket for fixing the SDPF converter to the engine.

* * * * *